United States Patent [19]
Gobin

[11] Patent Number: 5,012,046
[45] Date of Patent: Apr. 30, 1991

[54] CABLE ENTRY DEVICE FOR ELECTRIC APPLIANCES

[75] Inventor: Barry Gobin, Spennymoor, United Kingdom

[73] Assignee: Electrolux Northern Limited, Newton Aycliffe, United Kingdom

[21] Appl. No.: 370,264

[22] Filed: Jun. 22, 1989

[30] Foreign Application Priority Data

Jun. 23, 1988 [GB] United Kingdom ................. 8814968

[51] Int. Cl.⁵ .................. H02G 3/22; H02G 15/007; H01R 13/58
[52] U.S. Cl. ................................ 174/135; 174/153 G; 248/56
[58] Field of Search ............... 174/65 G, 135, 153 G; 248/56; 439/452, 453, 455, 460, 465, 467

[56] References Cited

U.S. PATENT DOCUMENTS 3,057,001 10/1962 Rapata ........................... 439/467 X
3,288,407 11/1966 Downer et al. ....................... 248/56
4,350,839 9/1982 Lass ........................... 174/153 G X

FOREIGN PATENT DOCUMENTS 2132758 1/1973 Fed. Rep. of Germany ... 174/153 G

Primary Examiner—Laramie E. Askin
Attorney, Agent, or Firm—Pearne, Gordon, McCoy & Granger

[57] ABSTRACT

Referring to FIG. 1, a cable entry device for an electric appliance comprises a body 2 and a protective sleeve 3 through which the cable 1 passes. The body is provided with cable grips 5, 6. Catches 10, 11 secure the body within the appliance. The body may be made as a one-piece plastic molding, comprising two portions joined by a web 7, which also acts as a spring to bias the catches into a locked position in the appliance.

4 Claims, 1 Drawing Sheet

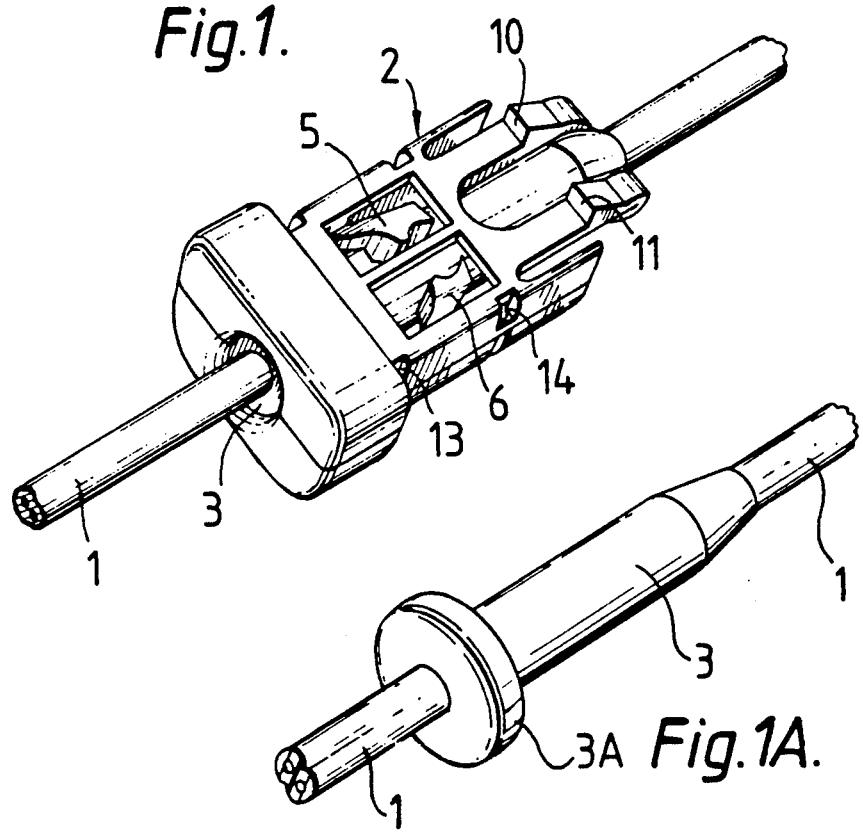
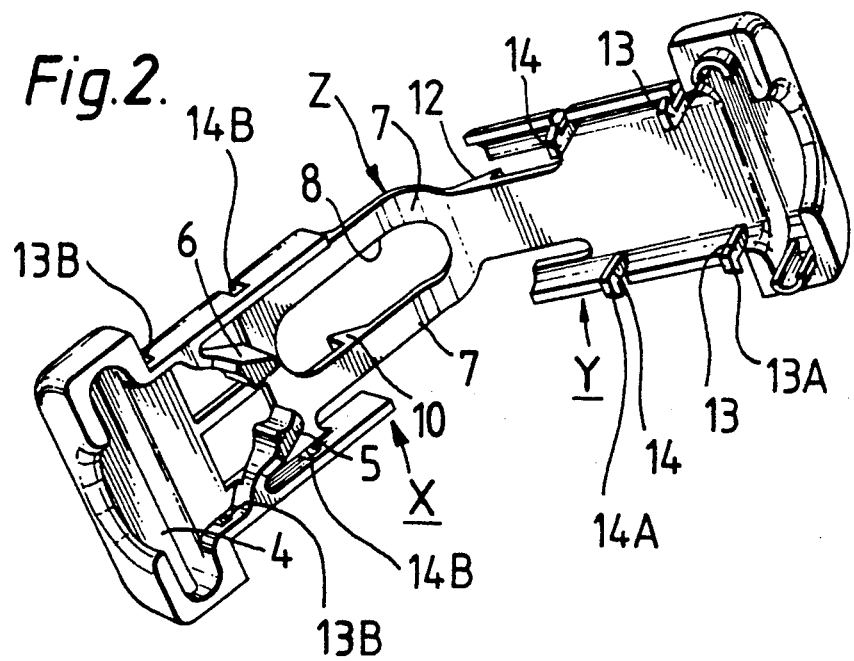

CABLE ENTRY DEVICE FOR ELECTRIC APPLIANCES

BACKGROUND OF THE INVENTION

The present invention relates to a cable entry device for an electric appliance.

Where an electric cable enters an appliance, be it a fixed appliance, for example, a domestic or workshop appliance, or an appliance which is moved from place to place by an operator, for example, an electric hand tool or an electrically driven lawn mower, it is important that the cable via the cable sheath should be firmly anchored to the appliance so that any force applied to the cable will be primarily resisted by the cable sheath, rather than being applied to conductor wires. Where the force is applied to the conductor wires within the cable, there is a tendency for the conductor wires to be pulled away from their terminal connections, with undesirable and possibly dangerous consequences.

In the past it has been customary to clamp the sheath of a cable within an appliance by means of a clamping bridge tightened by screws and bearing on the outer sheath of the cable. An alternative arrangement has been to locate the cable between a pair of cable grips which press against the cable and are inclined at an acute angle to the cable in such a way as to present a strong resistance to the cable being withdrawn.

Cable anchorages of these kinds are complex and involve a number of small components and do not lend themselves at all readily to automated production and assembly techniques. It is an object of the present invention to provide a cable entry device for an appliance in which the cable is anchored and which is simple, reliable and very readily assembled.

SUMMARY OF THE INVENTION

According to the present invention a cable entry device for an electric appliance comprises a body and a protective sleeve through which the cable passes, the body including at least one cable grip to grip the cable so as to resist its withdrawal from the body and at least one retaining catch to resist withdrawal of the body after insertion into the appliance. Preferably, the body is in the form of a one-piece molding made from a resilient material and comprising first and second body portions incorporating the cable grip (s), a flexible web interconnecting the body portions, the web bearing the retaining catch (es) and being so disposed relative to the catches as to act as a spring for them when the body is folded at the web to bring the portions together.

The invention provides a cable entry device with a body through which the cable passes and within which the outer sheath of the cable is gripped. This body is then pushed into the appliance where it is locked in position. Such a body, as will be explained below, may be made as a one-piece plastic molding.

BRIEF DESCRIPTION OF THE DRAWINGS

The invention will, be not described by way of example, with reference to the accompanying drawings in which:

FIG. 1 is a perspective view of a cable entry device and cable passing therethrough, according to the present invention;

FIG. 1A is a perspective view of a cable disposed within a protective sleeve of the cable entry device before the location in the body of the cable entry device; and FIG. 2 is a perspective view of the body of the cable entry device in its opened-out condition and before assembly around the cable.

DETAILED DESCRIPTION OF THE DRAWINGS

Referring first to FIGS. 1 and 1A, a cable 1 is shown passing through a body 2 and is protected at its point of entry by a flexible protective sleeve 3 of conventional form and molded from rubber or other insulating material.

The body 2 is a one-piece plastic molding having two portions X and Y interconnected by a web Z and shown in its opened-out condition in FIG. 2. At the entry to the body recess 4 receives a flange 3A by which the protective sleeve 3 is secured in the body. A pair of cable grips 5 and 6 are formed integrally with the body 2 for gripping the protective sleeve 3 surrounding the cable by engaging the sleeve surface at an acute angle in known manner. A strong resistance to the cable being pulled out of the cable entry device is thus achieved.

The web Z has two legs 7, with an elongated aperture 8 therebetween and through which the cable 1 passes when the entry device and cable are fully assembled. Catches 10, 11 are molded as shown on the outside of the legs 7 and a further catch is molded on portion Y in the region junction of the web Z and portion Y.

To assemble the cable entry device, the protective sleeve 3 is placed on the cable 1 and the cable is inserted through the aperture 8 with flange 3A at the end of the protective sleeve 3 disposed within the recess 4 and the cable passing between the cable grips 5 and 6. The two portions X and Y of the cable entry device are then folded together, the web Z being sufficiently thin and flexible to allow folding, and are secured in position by locking tabs 13 and 14. The locking tabs 13 have lugs 13A which engage slots 13B whereas the locking tabs 14 have lugs 14A which engage slots 14B.

The cable and entry device are then inserted into an appliance, where the catches, 10, 11 and 12 engage the appliance body to prevent withdrawal of the cable and the entry device. The resilient flexible web Z acts as a spring to urge the catches outwards into the locking position.

A cable entry device according to the invention thus provides a cheap, secure and readily assembled form of cable entry device which will prevent the cable being withdrawn and avoid stress on the cable being transferred to the terminals of the cable wires.

I claim:

1. A cable entry device comprising a body in the form of a one-piece molding made from a resilient plastic material, said body including first and second body portions, at least one locking tab for locking said body portions to each other in a closed position, at least one of said body portions incorporating a pair of spaced apart cable grips for gripping a cable and resisting withdrawal of the cable from said body, a flexible and resilient web interconnecting said body portions and serving to bias said body portions into an open position, said web including an aperture for receiving the cable and constituting a hinge about which said body portions are angularly displaceable about an axis which is transverse relative to the longitudinal extent of the cable, and at least one retaining catch molded integrally with said web for retaining said body in an appliance.

2. A cable entry device according to claim 1, wherein each of said body portions includes a recess for receiving a part of a flange of a protective sleeve placed on the cable prior to assembly in said body.

3. A cable entry device, comprising a body in the form of a one-piece molding made from a resilient plastic material and a protective sleeve for surrounding a cable and for placement within said body, said body including first and second body portions, at least one locking tab for locking said body portions to each other in a closed position, at least one of said body portions incorporating a pair of spaced apart cable grips for gripping a cable and resisting withdrawal of the cable from said body, a flexible and resilient web interconnecting said body portions and serving to bias said body portions into an open position, said web including an aperture for receiving the cable and constituting a hinge about which said body portions are angularly displaceable about an axis which is transverse relative to the longitudinal extent of the cable, and at least one retaining catch molded integrally with said web for retaining said body in an appliance.

4. A cable entry device according to claim 3, wherein said protective sleeve includes a flange, for receipt within said body portions and a tapered end portion remote from said flange, said tapered end portion entering said aperture in said web when said flange is received within said body portions.

* * * * *